United States Patent [19]

Buzbee et al.

[11] Patent Number: 5,933,622
[45] Date of Patent: Aug. 3, 1999

[54] METHOD FOR EFFICIENT HANDLING OF ASYNCHRONOUS EVENTS IN A DYNAMIC TRANSLATION SYSTEM

[75] Inventors: William B. Buzbee, Half Moon Bay; James S. Mattson, Jr., Campbell; Lacky Vasant Shah, Sunnyvale, all of Calif.

[73] Assignee: Hewlett-Packard Company, Palo Alto, Calif.

[21] Appl. No.: 08/967,392

[22] Filed: Nov. 8, 1997

[51] Int. Cl.$^6$ ..................................................... G06F 9/455
[52] U.S. Cl. ........................ 395/500; 395/580; 395/591; 395/685; 395/739
[58] Field of Search .................................. 395/500, 580, 395/685, 739, 734, 591, 733

[56] References Cited

U.S. PATENT DOCUMENTS

| | | | |
|---|---|---|---|
| 5,560,013 | 9/1996 | Scalzi et al. | 395/700 |
| 5,577,231 | 11/1996 | Scalzi et al. | 395/500 |
| 5,717,614 | 2/1998 | Shah et al. | 364/579 |
| 5,771,388 | 6/1998 | Mondrik et al. | 395/735 |

Primary Examiner—Kevin J. Teska
Assistant Examiner—Thai Phan

[57] ABSTRACT

A method for operating a computer to allow the running of a source program written for a first computer on a second computer. The second computer is assumed to include a branch taken trap. The method defines a plurality of collection points in the source program. A trap handling routine is supplied for processing traps. The trap handling routine determines whether execution has halted because of a branch taken trap at one of the collection points, and if so, retrieves information identifying an event from a queue and transferring the information and control to a handler in the source code. If execution has halted because of a branch taken trap at a location other than one of the collection points, execution of the source program is resumed with the branch taken trap armed. If execution has halted because of an asynchronous event, information specifying the event is stored in the queue, the branch taken trap is armed, and execution of the source program is resumed at the point at which execution was halted. The method may also be applied to optimizing compilers to provide a method for handling asynchronous interrupts in the optimized code.

5 Claims, 1 Drawing Sheet

METHOD FOR EFFICIENT HANDLING OF ASYNCHRONOUS EVENTS IN A DYNAMIC TRANSLATION SYSTEM

FIELD OF THE INVENTION

The present invention relates to computer systems, and more particularly, to methods for translating code which includes handlers for asynchronous events.

BACKGROUND OF THE INVENTION

To simplify the following discussion, the present invention will be explained in terms of programs for translating code from one computer to a computer with a different instruction set. However, as explained below, the present invention may be utilized in a wider range of translation and optimization problems.

The cost of translating code from one computer to a computer having a different instruction set is considerable, if not prohibitive in many instances. In some cases, the original source code is not available to the user, and hence, recompilation of the old program into instructions of the new computer is not an option. Even when the source code is available, the labor needed to adapt the code to the new architecture can require a substantial effort over an extended period of time. During this time, the user must still be able to run the old programs.

Accordingly, developers of new computers often provide emulators which allow code written in the old instruction set to be run on the new computer. In general, there is not a one-to-one correspondence between the instruction in the old instruction set and those in the new instruction set. Hence, the emulator often translates an instruction in the original code into a plurality of instructions in the new instruction set.

In addition, the hardware in the new computer may differ substantially from that in the old computer. For example, the number of registers and the length of these registers may differ between the two machines. Hence, the emulator must also provide a "virtual" machine that duplicates the old machine. For example, if the old computer system provided a response to an event which resulted in a dump of the registers being generated, the emulator must generate a dump of the contents of the virtual machine from the contents of the new computer.

Such dumps are often associated with asynchronous exceptions or events. In the old hardware, the event is assumed to occur between two instructions, since most exceptions allow an instruction in progress to be completed. The dump then represents the state of the system at the end of the instruction that has just been completed. If the code has indicated that the user is providing an event handler for the particular type of event that occurred, the dump is forwarded to the event handler when the hardware detects the event. The handler assumes that the dump represents the state of the system at the end of the last instruction encountered in the old code.

The emulation of asynchronous events is complicated by the lick of a one-to-one mapping between the old and new instruction sets. Consider the case of an instruction in the old code set that is mapped into 3 instructions in the new instruction set. If an event occurs between the first and second instruction in the emulation, the state of the virtual machine is not well defined, since the virtual machine is still in the middle of the execution of an instruction in the old instruction set. Hence, the event must be "stored" until the end of the third instruction. At that time, the state of the virtual machine is known and the event can be sent to the appropriate handler with a dump of the virtual machine.

One method for accommodating asynchronous events is to insert code at the end of each block of instructions to test for the occurrence of such an event. While this assures that the virtual machine is in a known state, the overhead involved in this approach is considerable. Asynchronous events are rare. Hence, the event checking code seldom finds an event while requiring the execution of an instruction between each instruction in the original code.

To reduce this overhead, prior art systems make use of the observation that by nature, asynchronous events are not predictable. Accordingly, the handlers provided in the old computer code cannot depend on the exact instruction at which the event occurred. As a result, it is sufficient to check for the occurrence of an event at more widely separated points in the original code. While this approach reduces the overhead discussed above, the overhead remains substantial. For example, if the event check is performed at each backward branch in the code, then an instruction must be inserted at each potential branch. This instruction is executed each time the branch is taken, whether or not an event has occurred.

Broadly, it is the object of the present invention to provide an improved method for handling asynchronous events in an emulation system.

It is a further object of the present invention to provide a method for handling asynchronous events in an emulation system that imposes less overhead than prior methods.

These and other objects of the present invention will become apparent to those skilled in the art from the following detailed description of the invention and the accompanying drawings.

SUMMARY OF THE INVENTION

The present invention is a method for operating a computer to allow the running of a source program written for a first computer on a second computer. The second computer is assumed to include a branch taken trap. The method defines a plurality of collection points in the source program. A trap handling routine is supplied for processing traps. The trap handling routine determines whether execution has halted because of a branch taken trap at one of the collection points, and if so, retrieves information identifying an event from a queue and transferring the information and control to a handler in the source code. If execution has halted because of a branch taken trap at a location other than one of the collection points, execution of the source program is resumed with the branch taken trap armed. If execution has halted because of an asynchronous event, information specifying the event is stored in the queue, the branch taken trap is armed, and execution of the source program is resumed at the point at which execution was halted.

DETAILED DESCRIPTION OF THE INVENTION

Figure 1:
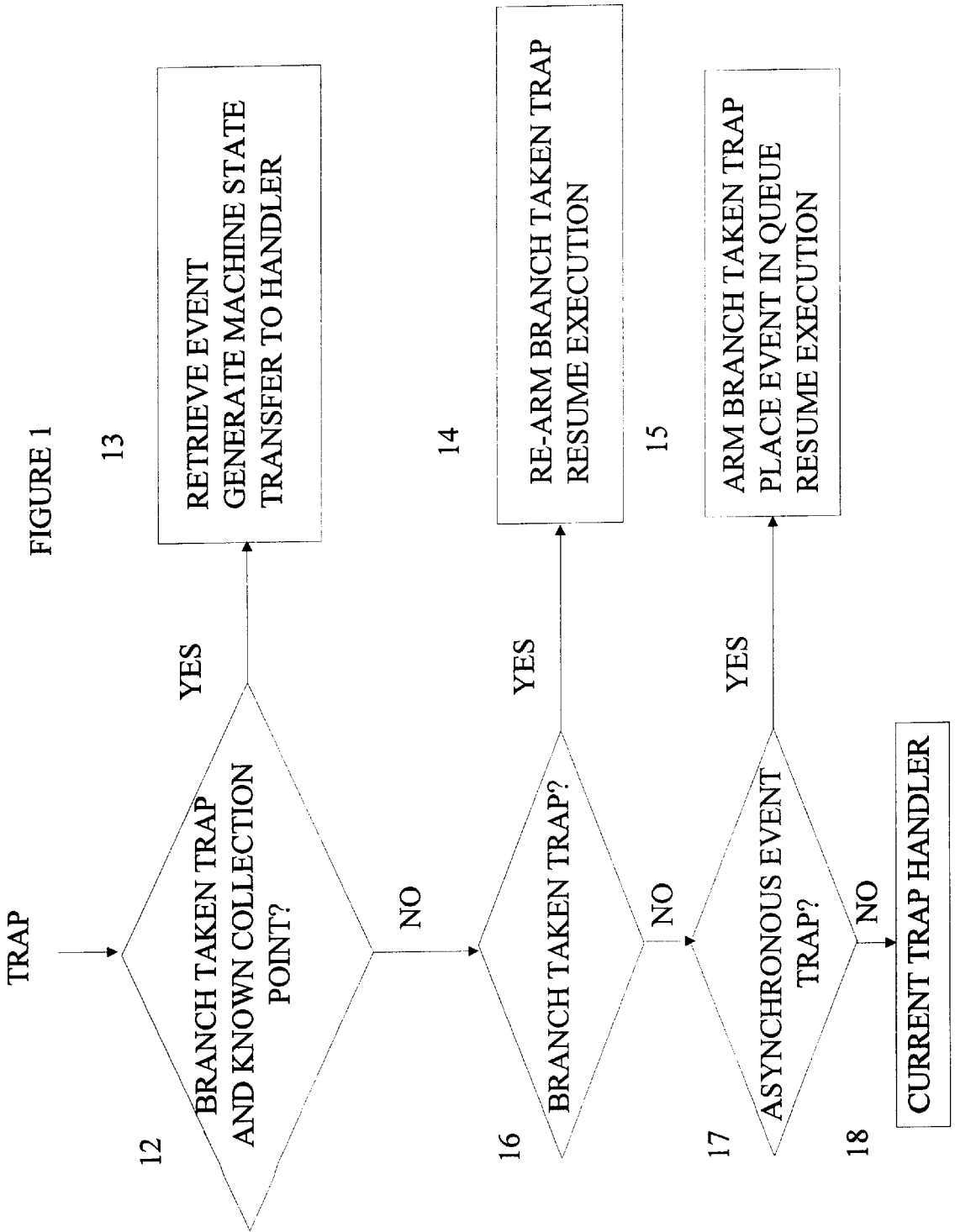
FIG. 1 is a flow chart of a trap handler according to the present invention.

The present invention will be discussed in terms of a dynamic translation system that converts code from a source machine architecture to a target machine architecture at run-time. To simplify the following discussion, a number of terms will be defined. The source code may be viewed as a plurality of basic blocks of code. A basic block is a sequence of instructions which ends with a branch and contains no other branches. In general, the first instruction of each basic block is the target of a branch.

A trace is defined as a sequence of basic blocks which are connected by branches. If the program leaves the trace because of an internal branch, the target of the branch will, in general, be the first statement of a basic block which may also be the first basic block in a second trace. A basic block may be viewed as the degenerate case of a trace. Hence, for the purposes of the present discussion, the term trace will be deemed to include the case of a single basic block unless otherwise specified.

In the preferred embodiment of the present invention, the dynamic translation system translates traces from the source code into blocks of code in the target architecture. The translated code is placed in a cache and is executed from the cache. Key addresses associated with the code in the cache are stored in a table associated with the cache.

The source address of the first statement of each trace is one of these addresses. When the currently running trace branches to another trace, the translation system must determine if the target trace is already in the cache. To make this determination, the target address in the new architecture is used to lookup the corresponding target address in the source code. If the trace beginning with that address is in the cache, the translation system need not translate the new trace, since it is already in the cache. If the trace is not in the cache, it is translated and placed in the cache. The addresses corresponding to its branches are then stored in the table. As will be explained in more detail below, this table can provide the data needed to implement the asynchronous event handling system of the present invention.

A collection point will be defined to be a point in the source code at which the handling of an asynchronous event can be turned over to a handler in the source code with a dump of the virtual machine. In the preferred embodiment of the present invention, the collection points coincide with backward branches in the source code. However, other branches may also be utilized.

The present invention is operative in machine architectures that include a "branch taken" trap. This mechanism is armed by setting a control bit in the CPU. If the bit is set, the next time a branch is taken, the machine will trap and control will be transferred to the corresponding trap processing routine.

The manner in which the present invention operates will now be explained with reference to FIG. 1 which is a flow chart of the basic algorithm used by the trap handler on the new machine. This portion of the trap handling routine determines whether execution has halted because of a branch taken trap or because of an asynchronous event on the target machine.

When the system halts, the trap handler first determines if execution has halted at a known collection point as the result of a branch taken trap as shown at 12. This case will only occur if an asynchronous event was previously detected and the branch taken trap armed. It is assumed that the previous event loaded the information specifying the event in a queue. Since the targets of the backward branches which are the collection points are the first statements of traces in the cache, the trap routine can determine if the execution point is at a known collection point by searching for the current address in the table discussed above.

If the execution has halted at a known collection point, the event is retrieved from the queue as shown at 13. The state of the virtual machine is then generated and delivered to the application's handler. If the operation was halted because of a branch which is not a collection point as shown at 16, i.e., a forward branch, the branch taken trap is re-armed and execution is resumed as if no trap had occurred as shown at 14.

If the asynchronous event was not a branch taken trap as shown at 17, the event is loaded into the queue as shown at 15. The branch taken trap is then armed. The execution of the routine is resumed as if the event had not happened. Execution will then continue until the next branch is taken that will result in a trap being processed by block 12 of the flow chart.

If the trap was not the result of an asynchronous event or branch taken trap, the current version of the trap handler will handle the trap as shown at 18.

As noted above, the collection points are preferably defined to be the backward branches. These branch locations are stored in the table discussed above. The code that maintains that table already includes the code for searching the table for a branch target. Hence, no new code is needed.

In addition, the backward branch collection points assure that the machine will not loop waiting for an asynchronous event. Consider the case of a loop waiting for an event. If the loop does not contain a collection point, the loop will never terminate when the event occurs. Since all such loops have a backward branch, this situation is prevented by using the backward branches as the collection points.

In principle the forward branches in the source code could also be included in the set of collection points; however, this would require that these address also be stored.

It should be noted that the present invention imposes no overhead on the system until an asynchronous event occurs. No instructions are added to the translation to explicitly check for an event. Since asynchronous events occur only rarely, the method of the present invention imposes very little overhead even when an event occurs.

The method of the present invention has been described in terms of translating code between computers having different instruction sets. However, it will be apparent to those skilled in the art that the method may be applied in other situations. For example, many compilers generate an intermediate code which is more or less machine independent. The intermediate code is then optimized for the particular computer hardware. A translation system such as discussed above may be utilized in this case as well. In essence, the intermediate code represents a code for a computer having a different instruction set than the target hardware on which the code is to execute.

Optimizing compilers also re-sequence computer code to provide more efficient execution. Such re-sequencing can affect asynchronous event handlers which expect to receive a "snap-shot" of the hardware at the time of the asynchronous event. Since the event handlers cannot predict the event, it is usually sufficient to provide the handler with a coherent picture of a machine state at a point close to that at which the interrupt was generated. The present invention provides such a mechanism, since it provides the handler with a snap-shot of the hardware at the next collection point. Accordingly, the present invention may also be utilized in an optimizing compiler that re-sequences code to provide a method for handling asynchronous events.

Various modifications to the present invention will become apparent to those skilled in the art from the foregoing description and accompanying drawings. Accordingly, the present invention is to be limited solely by the scope of the following claims.

What is claimed is:

1. A method for operating a computer to allow the running of a source program written for a first computer on a second computer said second computer including a branch taken trap, said method comprising the steps of:

defining a plurality of collection points in said source program, said collection points comprising instructions in said source program;

providing a trap handling routine for processing traps, said trap handling routine being operative when a trap occurs and comprising the steps of:

(a) determining whether execution has halted because of a branch taken trap at one of said collection points, and if so, retrieving information identifying an event from a queue and transferring said information and control to a handler in said source code;

(b) determining whether execution has halted because of a branch taken trap at a location other than one of said collection points, and if so, resuming execution of said source program with said branch taken trap armed; and (c) determining whether execution has halted because of an asynchronous event, and if so, storing information specifying said event in said queue, arming said branch taken trap, and resuming execution of said source program at the point at which execution was halted.

2. The method of claim 1 wherein said first computer includes at least one instruction that is not included in the instruction set of said second computer.

3. The method of claim 1 wherein said collection points comprise backward branches in said source code.

4. The method of claim 1 wherein step(a) further comprises generating a state description for a virtual machine of the same architecture as said first computer.

5. The method of claim 1 wherein step(a) comprises examining the entries in a table created by a code translation system used to convert blocks of code in said source program to corresponding blocks of instructions in the instruction set of said second computer.

* * * * *